United States Patent [19]

Nakamura et al.

[11] Patent Number: 4,809,215

[45] Date of Patent: Feb. 28, 1989

[54] INFORMATION PROCESSING SYSTEM HAVING DECODE, WRITE AND READ MEANS

[75] Inventors: Koozoo Nakamura, Hitachiota; Masaharu Tadauchi, Mito; Nagaharu Hamada, Hitachi, all of Japan

[73] Assignee: Hitachi, Ltd., Tokyo, Japan

[21] Appl. No.: 2,203

[22] Filed: Jan. 12, 1987

[30] Foreign Application Priority Data

Jan. 13, 1986 [JP] Japan .................................... 61-3451

[51] Int. Cl.[4] .................................................. G06F 3/153

[52] U.S. Cl. ........................................ 364/900; 340/804

[58] Field of Search ....... 364/200 MS FILE, 900 MS File; 340/750, 798, 799, 804

[56] References Cited

U.S. PATENT DOCUMENTS 4,069,511 1/1978 Lelke .................................... 364/200
4,070,710 1/1978 Sukonick et al. .................... 364/900
4,110,794 8/1978 Lester et al. .
4,378,594 3/1983 Kenyon ................................. 364/900
4,561,025 12/1985 Tsuzuki .

FOREIGN PATENT DOCUMENTS 2129652 5/1984 United Kingdom .
2160063 12/1985 United Kingdom .
8601667 3/1986 World Int. Prop. O. .

OTHER PUBLICATIONS

Nakamura et al., "High Speed Encoding and Decoding Processor for Group 4 Facsimile Apparatus", 1984, IEEE, pp. 219-222.

*Primary Examiner*—Thomas M. Heckler
*Attorney, Agent, or Firm*—Antonelli, Terry & Wands

[57] ABSTRACT

In an information processing system for efficiently allocating a writing of a decoded pixel signal into a display memory to a period other than the period during which a read circuit accesses the display memory for reading out information to a display device for a display, the read circuit indicates to a decode/write circuit producing the decoded pixel signal a period during which the read circuit does not access the display memory, and the decode/write circuit writes the decoded pixel signal into the display memory at a timing at which the display memory is not accessed by the read circuit.

10 Claims, 7 Drawing Sheets

INFORMATION PROCESSING SYSTEM HAVING DECODE, WRITE AND READ MEANS

BACKGROUND OF THE INVENTION

The present invention relates to an apparatus for decoding a text having information which is compressed by a redundancy suppression encoding system as used in a facsimile and for displaying the decoded information, and more particularly to an information processing system having decode, write and read means suitable for an electronic filing apparatus.

Major methods for representing the content of a document include raster graphics content architecture, character content architecture and geometric graphics content architecture as shown in FIG. 10. The first architecture employs an MH (modified Huffman) code, an MR (modified READ) code or an MMR (modified modified READ) code. The second architecture uses a character code. The third method uses a vector code.

When text information is to be displayed on a display device, it is necessary to periodically read a display memory which the text information is stored, for purposes for refreshing the display in view of the nature of the display device. An apparatus which can write information into the display memory without interrupting the display in the geometric graphics content architecture is disclosed in Microcomputer Application International Conference '84, pages 279 to 286.

However, in the raster graphics content architecture, no consideration has been made to decode compressed text information to an original pixel signal and write the pixel signal into the display memory without interrupting the display.

There is no decode function in the prior art raster graphics content architecture and it must be attained by separate means. An apparatus having a decode function is disclosed in the Technical Journal of The Institute of Electronics and Communication Engineers of Japan, IE84-17 and JP-A-No. 59-126368. In those prior art apparatuses, no consideration is given to writing a decoded pixel signal into a display memory without interrupting the display and displaying the pixel signal under decoding serially on the display device, and it is not possible to review the content of the text until one page or one screen of information has been decoded.

SUMMARY OF THE INVENTION

It is an object of the present invention to serially display a pixel signal under decoding.

The above object is achieved by efficiently allocating a period other than a display memory access period by read means to writing into the display memory of a pixel signal decoded by decode/write means.

The read means indicates to the decode/write means a period during which the read means does not access the display memory. As a result, the decode/write means can write the decoded pixel signal into the display memory at a timing at which the display memory is not accessed by the read means so that the text information under decoding can be serially displayed on the display device.

DESCRIPTION OF THE PREFERRED EMBODIMENTS

One embodiment of the present invention is explained with reference to the drawings.

Figure 1:
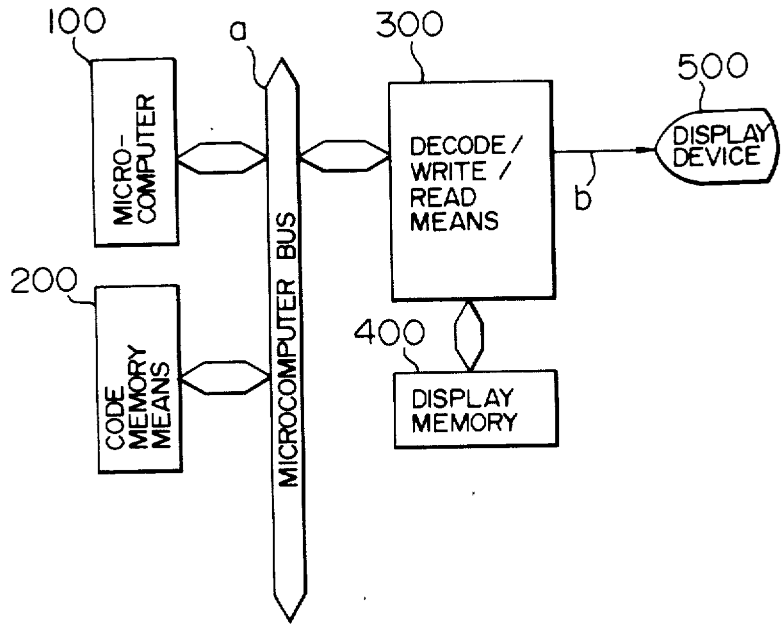
FIG. 1 shows a block diagram of one embodiment of the present invention.

In FIG. 1, numeral 100 denotes a microcomputer for controlling an overall system, and numeral 200 denotes means for storing information which represents a text by codes. For example, a recording medium may be an optical disk or a floppy disk, and a redundancy suppression code such as a code may be an MH (modified Huffman) code used in a facsimile, or a character code used in telex. Numeral 300 denotes decode/write/read means for decoding the code into an original pixel signal to display it on a display device 500 and numeral 400 denotes a display memory which is usually a semiconductor memory for storing a pixel signal to be displayed. The display 500 may be a CRT display, or a flat display such as liquid crystal display, EL display or ECD display. A letter a denotes a microcomputer bus through which an address signal, a data signal and a control signal are transferred, by which the microcomputer 100 accesses the code memory means 200 and the decode/write/read means 300. A letter b denotes a video signal path through which a video signal to be displayed on the display device 500 is transferred.

The operation is now explained.

The microcomputer 100 supplies the code stored in the code memory means 200 to the decode/write/read means 300 through the microcomputer bus a. The decode/write/read means 300 decodes the input code into the original pixel signal, writes it into the display memory 400, reads a video signal from the display memory 400 and supplies it to the display device 500 through the video signal path b to display the decoded pixel signal.

In the present embodiment, since the pixel signal under decoding is serially displayed on the display device 500, the content of the text can be rapidly monitored. In addition, since the operation state of the system is always known, an operator can wait, without anxiety, for the completion of one screen of information.

Figure 2:
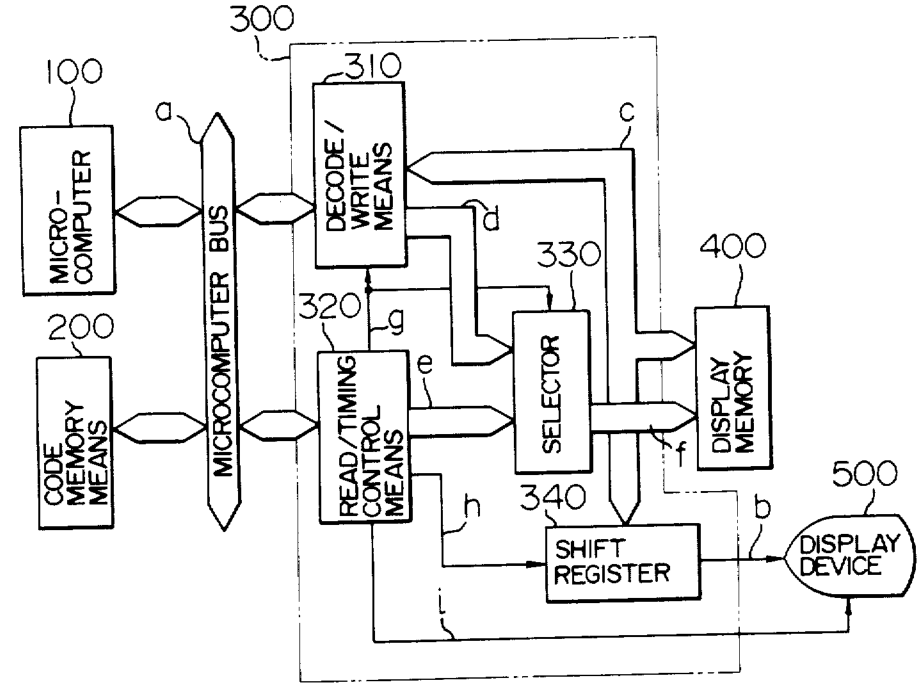
FIG. 2 shows a block diagram of decode/write/read means of FIG. 1.

FIG. 2 shows a detail of the decode/write/read means 300. Numeral 310 denotes decode/write means for decoding a redundancy suppression code and writing a pixel signal into the display memory. It may be decode/write means which uses an LSI (facsimile codec processor—FCP) for decoding an MH code shown, for example, as disclosed in the previously mentioned Technical Journal of the Institute of Electronics and Communication Engineers of Japan, IE84-17. Numeral 320 denotes read/timing control means for reading a video signal from the display memory 400 and supplying it to the display device 500 through the video signal path b. It may be a read/timing control means which uses a conventional CRT controller LSI (advanced CRT controller—ACRTC). Numeral 330 denotes a selector which selects a decode/write address control bus d through which the decode/write means 310 accesses the display memory 400 or a read address control bus e through which the read/timing control means 320 accesses the display memory 400. Numeral 340 denotes a shift register which latches an n-bit (where n is a natural number) pixel signal read from the display memory 400 and converts it to a video signal. Letter h denotes a shift register control signal path through which a latch pulse and a shift pulse from the read/timing control means 320 are supplied to the shift register 340. Letter i denotes a display control signal path through which the read/timing control means 320 supplies a control signal such as a horizontal synchronization signal or a vertical synchronization signal to the display device 500. Letter g denotes an access permit signal path through which the decode/write means 310 sends an access permit signal which indicates a period during which the display memory 400 may be accessed, letter c denotes a decode/write data bus, and letter f denotes a read memory address control bus.

The operation is now explained.

The code on a page selected by the microcomputer 100 is supplied to the decode/write means 310 through the microcomputer bus a. The decode/write means 310 decodes the input code into the pixel signal of the original text, and after it confirms that the access permit signal has been applied, it writes the decoded pixel signal into the display memory 400. The pixel signal stored in the display memory 400 is read by the read/timing control means 320, supplied to the display device 500 as a video signal and sequentially displayed.

In the present embodiment, the access by the read/timing control means 320 to the display memory 400 is prioritized relative to the access by the decode/write means 310 to the display memory 400. Accordingly, the decoded pixel signal is sequentially displayed on the display device 500 without flickering.

Since the decode/write means 310 can decode the code during the display period, the two functions, displaying and decoding, can be parallelly executed.

Since the decoding memory and the display memory are common, the number of memories required can be reduced.

Figure 3A:
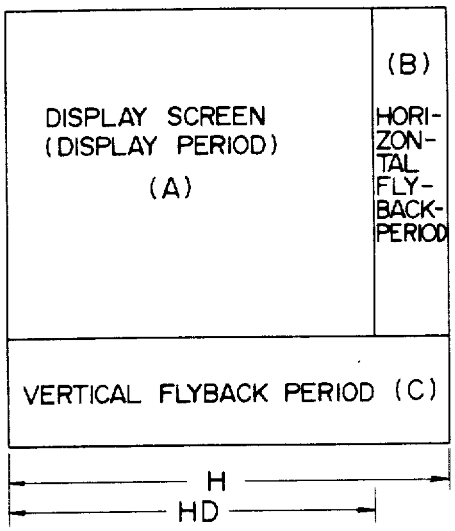
FIG. 3A shows a display period and non-display period.
Figure 3B:
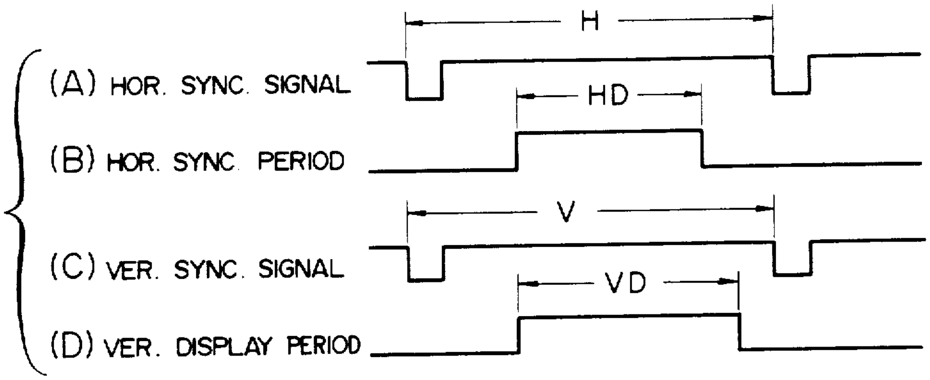
FIG. 3B shows an operation timing chart of the circuit shown in FIG. 2.

FIG. 3A shows a relationship between the display period and the non-display period, and FIG. 3B shows their timing relationship.

FIG. 3A shows the display period (A) and the non-display period on the display screen. The non-display period comprises a horizontal flyback period (B) and a vertical flyback period (C). H denotes a horizontal synchronization period.

FIG. 3B shows a timing chart of the display timing, in which (A) represents a horizontal synchronization signal, (B) represents a horizontal display period HD, (C) represents a vertical synchronization signal and (D) represents a vertical display period VD. V denotes a vertical synchronization period.

For example, in a non-interlace CRT having 640 dots×400 lines, H=41.3 μs, HD=31.8 μs (640 dots), V=448×H and VD=400×H. In such an apparatus, the decode/write means 310 can access the display memory 400 during the non-display period, $41.3\times(448-400)+(41.3-31.8)\times400$ μs of the screen display period.

Figure 4:
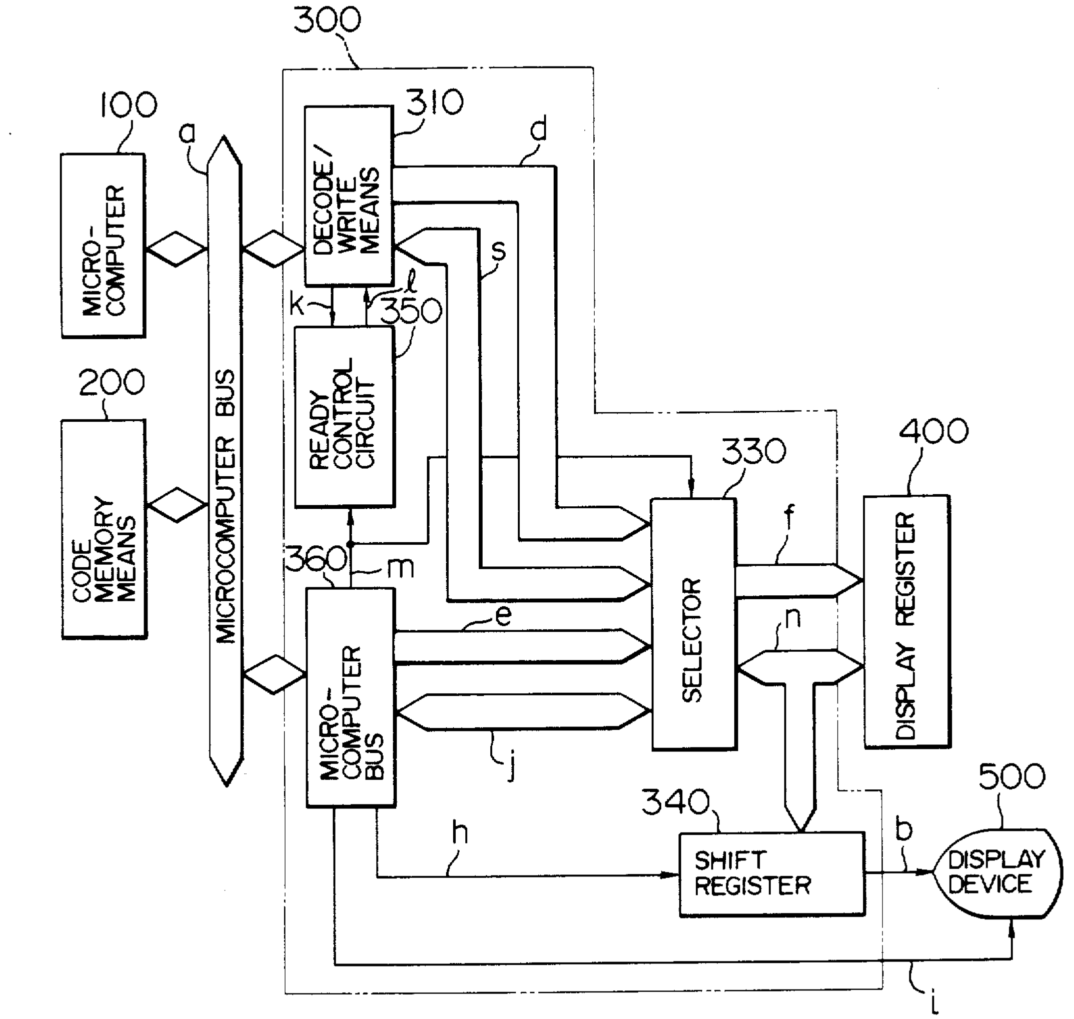
FIG. 4 shows a detailed block diagram of decode/write/read means shown in FIG. 2.

FIG. 4 shows an embodiment in which the decode/write means 310 can access a display memory 400 during the display period.

Numeral 350 denotes a ready control circuit which, when the decode/write means 310 accesses the display memory 400 during the display period, indicates an access incomplete state until the end of the display cycle, and indicates an access ready state at the end of the display cycle. Numeral 360 denotes read/timing control means for reading information and controlling timing. It alternately splits the display period into the display cycle and the non-display cycle to allow reading from the display memory 400 and writing into the display memory 400. In the write mode, a write address and a write control signal are supplied to the display memory 400 through a read address control bus d. When the writing is not executed, the read/timing control means 360 indicates the non-display cycle to the ready control circuit 350 through a signal path m. Letter n denotes a read memory data bus, letter d denotes a decode/write address control bus, letter s denotes a decode/write data bus, and letter j denotes a read data bus.

A detail of the operation is explained with reference to FIG. 5.

Figure 5:
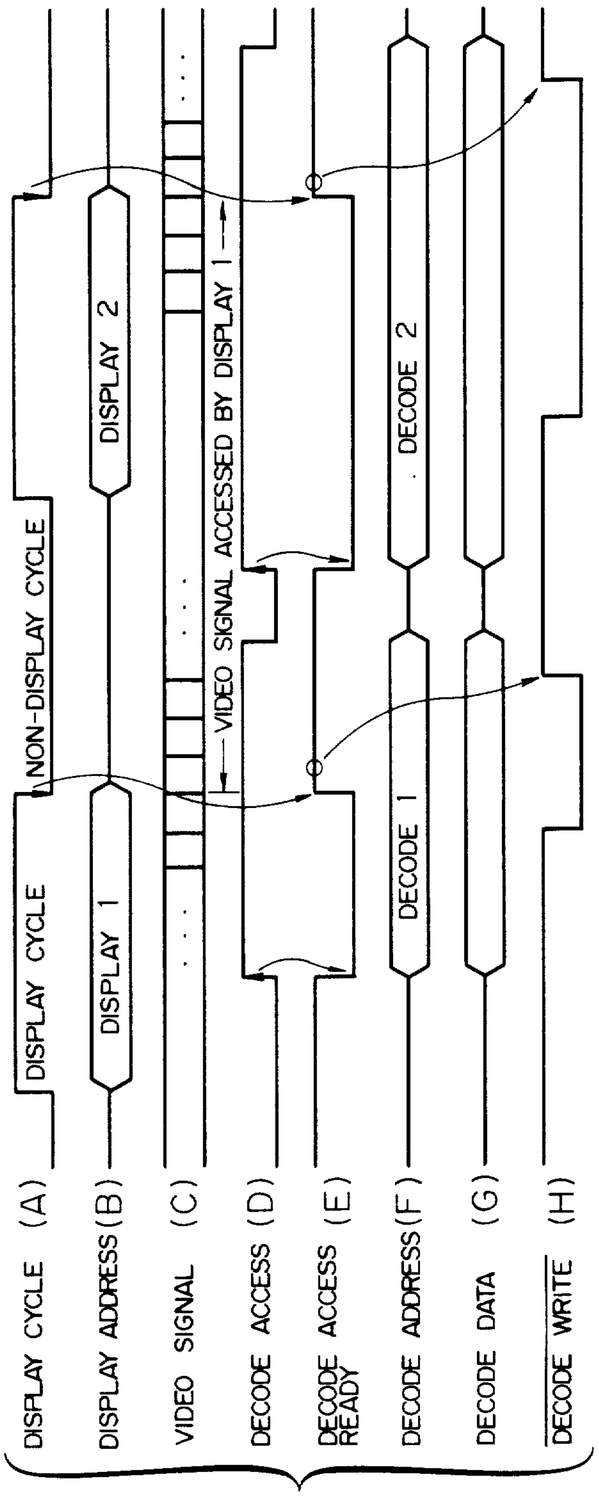
FIG. 5 shows an operation timing chart of FIG. 4.

FIG. 5 shows a timing in the display period during which the decode/write means 310 accesses the display memory 400.

(A) indicates a timing in which the display cycle and the non-display cycle alternately appear. (B) indicates a display address which shows a timing in the display cycle at which the read/timing control means 360 supplies the display address to the display memory 400. (C) indicates a video signal output timing. The pixel signal read in the display cycle (1) is supplied to the display device 500 as the video signal from the end of the display cycle (1) to the end of the next display cycle (2). (D) indicates the timing at which the decode/write means 310 accesses the display memory 400. The decode access signal is supplied to the ready control circuit 350 through a signal path k. When the ready control circuit 350 receives the decode access signal, it negates the decode access ready (E) and indicates an access incomplete state to the decode/write means 310 through a signal line l. The decode/write means 310 outputs the decode address (F), decode data (G) and decode write (H) and waits until the decode access ready (E) is asserted. The ready control circuit 350 asserts the decode access ready (E) when the display cycle ends and the non-display cycle starts. When the decode access ready (E) is asserted, the decode/write means 310 terminates the decode write (H) and completes the accessing to the display memory 400.

In the present embodiment, since the decode/write means 310 can access the display memory 400 during the display period, high speed decoding and writing can be attained.

Since the decode/write means 310 outputs the decode address and decode data during the display cycle period, the access to the display memory 400 can be completed in a short non-display cycle period.

Figure 6:
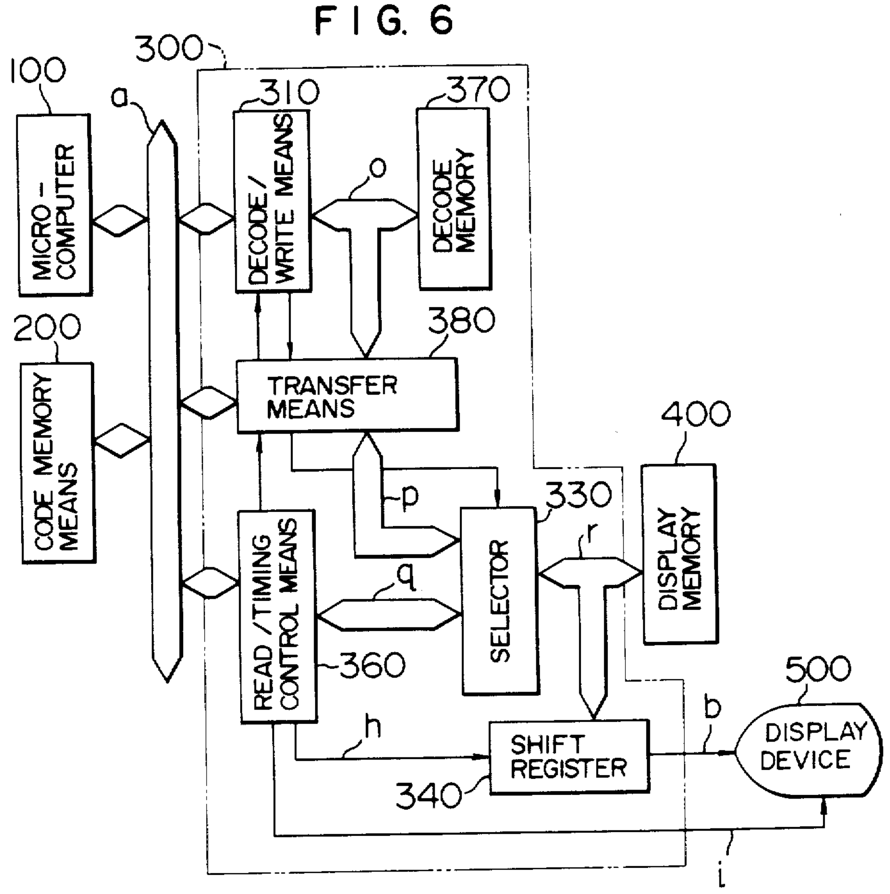
FIG. 6 shows another detailed block diagram of the decode/write/read means of FIG. 1.

FIG. 6 shows an embodiment in which decoding can be executed during the display period.

Numeral 370 denotes a decode memory which is separate from the display memory 400 for decoding and writing, and numeral 380 denotes transfer means for transferring the pixel signal stored in the decode memory 370 to the display memory 400. Letter o denotes a decode/write address control-decode/write data bus, letter p denotes a decode/write data-read memory address control bus, letter q denotes a read address control-read data bus, and letter r denotes a read memory address control-read memory data bus.

Figure 7:
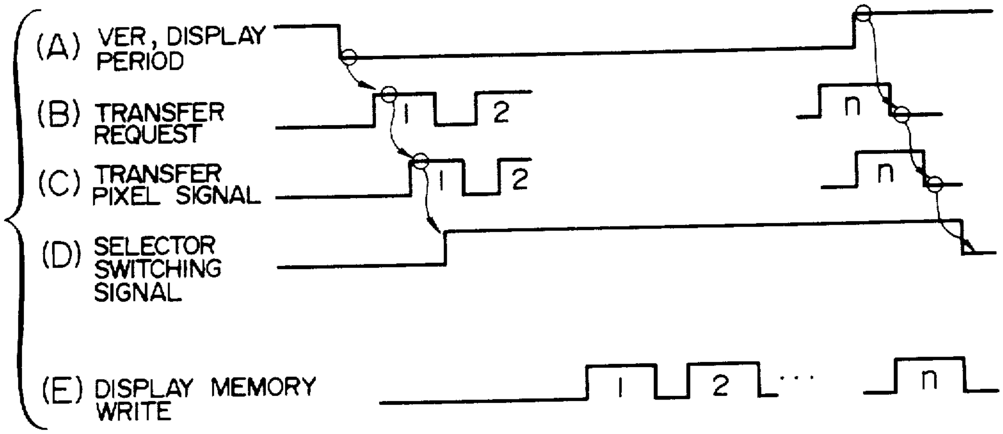
FIG. 7 shows an operation timing chart of FIG. 6.

The operation is explained with reference to FIG. 7.

When the vertical display period (A) is negated, the transfer means 380 outputs the transfer request (B) for the pixel signal in the decode memory 370, to the decode/write means 310. When the decode/write means 310 receives the transfer request (B), it interrupts the decoding/writing and outputs the pixel signal in the decode memory 370 to the transfer means 380 (C). When the transfer means 380 receives the pixel signal from the decode/write means 310, it supplies the switching signal (D) to the selector 330 to connect the display memory bus of the transfer means 380 to the display memory 400 and writes the input pixel signal into the display memory 400 (E). When the vertical display period (A) is asserted, the transfer means 380 writes the last pixel signal received before the vertical display period (A) is negated, into the display memory 400, and then it negates the switching signal (D) and connects the display memory bus to the read/timing control means.

In the present embodiment, the transfer means 380 may not output the decode memory address but the transfer means 380 may be afforded with a title to the decode memory bus from the decode/write means 310 and directly access the decode memory 370.

In the present embodiment, since the decode/write means 310 can execute the decoding/writing independently from the operation state of the read/timing control means 360, high speed decoding/writing is attained.

In the present embodiment, even if the resolution of the decoded image is different from that of the display screen, the transfer means 380 converts the resolution so that the decoded image can be displayed on the display screen.

Since the memory capacity required for the decode memory 370 is smaller than the memory capacity required for the display memory 400, the access speed to the decode memory 370 may be higher than the access speed to the display memory 400 and hence high speed decoding/writing is attained.

Figure 8:
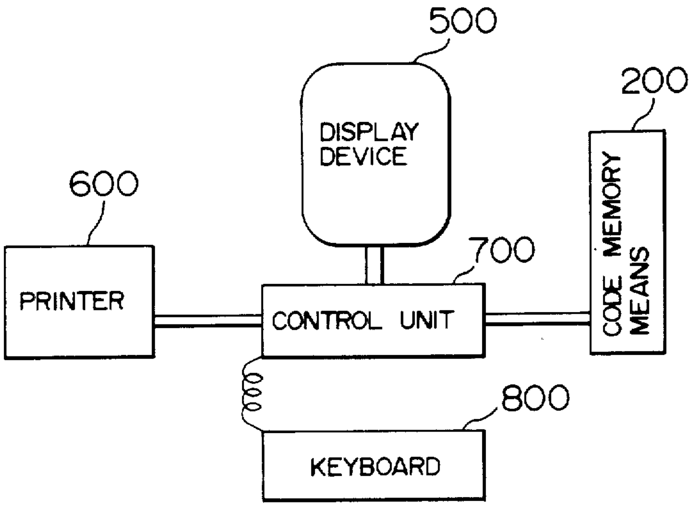
FIG. 8 shows a system configuration of one embodiment of the present invention.

FIG. 8 shows an embodiment in which the present invention is applied to an electronic document file system.

Numeral 700 denotes a control unit which comprises a microcomputer 100, decode/write/read means 300 and a display memory 400. Numeral 600 denotes a printer which records a selected document on a sheet. Numeral 800 denotes a keyboard which inputs a file name of a document to be retrieved to the control unit 700.

An operation is explained below.

When the control unit 700 receives from a keyboard 800 a document name to be retrieved, it looks up the code memory means 200 to retrieve the code of the designated document and decodes it into the original pixel signal and sequentially displays it on the display device 500. When the designated document consists of a plurality of pages, it is sequentially displayed on the display device 500 by paging. At the boundary of the images or pages, the updating of the display is interrupted for a predetermined period to facilitate an operator an checking the content of the display screen.

Figure 9:
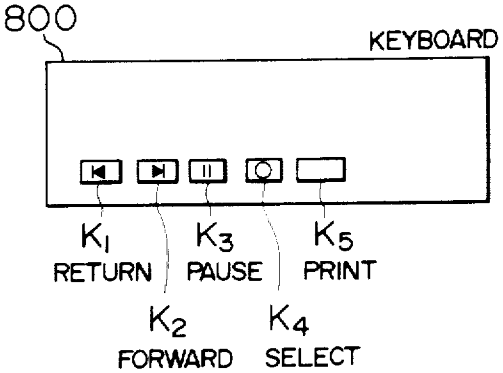
FIG. 9 shows a detail of a keyboard shown in FIG. 8.
Figure 10:
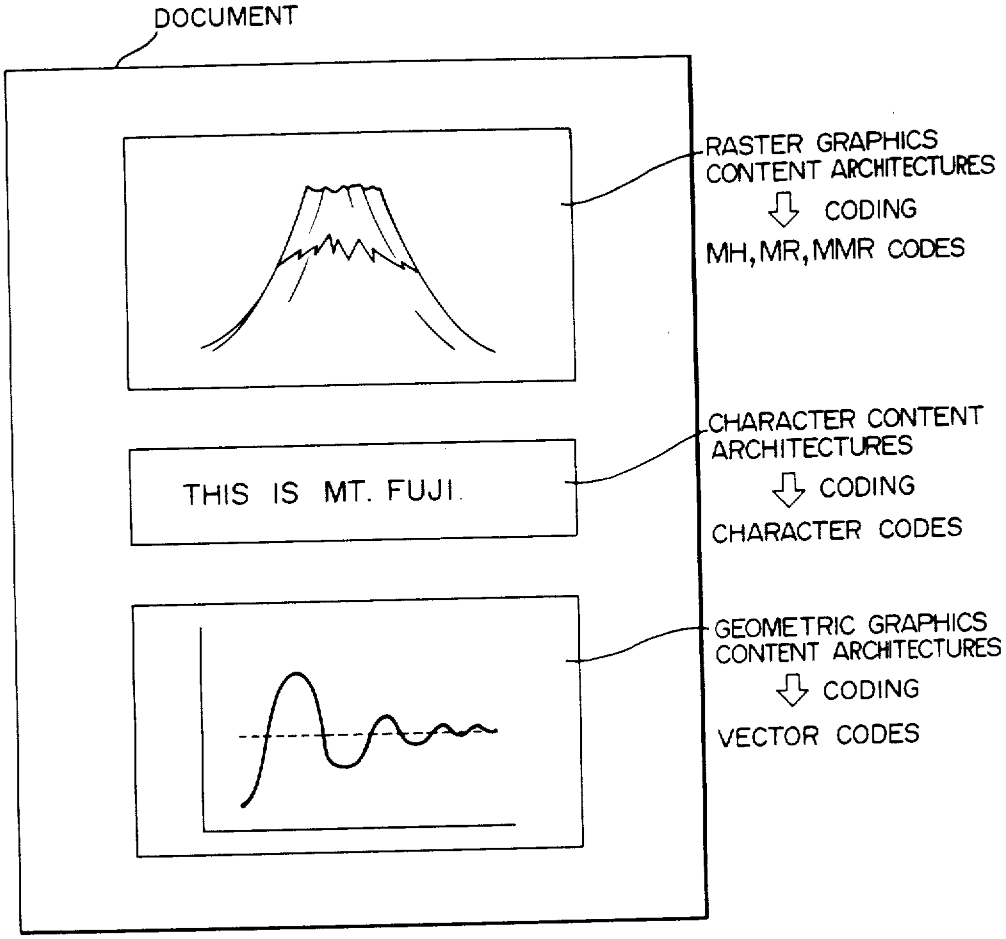
FIG. 10 shows methods for representing content of a document.

FIG. 9 shows a keyboard 800 suitable for the retrieval. While only function keys are shown, a ten-key pad and other keys may be included.

When a return key $k_1$ is depressed, the display image is returned to the previous page or image. When a forward key $k_2$ is depressed, the decoding and displaying of the current page are stopped, and the decoding and displaying of the next page is started. When a pause key $k_3$ is depressed, the updating of the display image is interrupted. When a selection key $k_4$ is depressed, the updating of the display is interrupted after the completion of the display of the page currently being displayed. When a print key $k_5$ is depressed, the selected page is printed out.

Those functions are carried out by means in the control unit.

In the present embodiment, whether the page under decoding is necessary or not can be quickly determined by watching the page, the necessary document can be quickly retrieved.

In accordance with the present invention, the pixel signal under decoding and writing can be sequentially displayed on the display device so that the content of the text can be qucikly recognized.

We claim:

1. An information processing system comprising:
decode means for decoding codewords, which are generated by encoding pixel signals using a redundancy suppressing encoding method, to obtain original pixel signals to be stored in a display memory as display data;
a display memory for storing the decoded pixel signals;
write means connected to said decode means for writing the decoded pixel signals into said display memory;
read means for decoding vector codes, which are encoded by a computer into pixel signals, for storing the pixel signals into said display memory, and for reading the pixel signals from said display memory to output the said decoded pixel signals to a display device; and
timing control means for selectively enabling said decode means for decoding said codewords, said write means for writing the decoded pixel signals into said memory, and said read means for accessing said display memory, so that said decode means and said read means may be enabled to operate at the same time, but said write means and said read means are enabled to access said display memory only during different periods of time.

2. An information processing system according to claim 1, wherein said timing control means controls said write means so that the decoded pixel signal is written into said display memory only during a horizontal flyback period and/or vertical flyback period of a non-display period of the display device.

3. An information processing system according to claim 2 wherein, when the access to said display memory by said write means and the access to said display memory by said read means, said timing control means controls said read means and said write means to that the access by said read means is prioritized and the access to said display memory by said write means waits until the end of the display period.

4. An information processing system according to claim 1 wherein the display period of said display device is divided into a display cycle period and a non-display cycle period, and the decoded pixel signal is written into said display memory by said write means during said non-display cycle period.

5. An information processing system according to claim 4 wherein when said write means accesses said display memory during said display cycle period, the access to said display memory by said write means waits until said display cycle period switches to said non-display cycle period.

6. An information processing system according to claim 1 further comprising a decode memory for decoding and writing separate from said display memory, wherein said decode means includes means for writing the decoded pixel signal into said decode memory and for transferring the pixel signal stored in said decode memory to said display memory during horizontal flyback period and/or vertical flyback period and/or the non-display cycle period of the display device.

7. An information processing system according to claim 1 further comprising means for interrupting updating of the display for a predetermined period after the end of the display of one page or one image of display data.

8. An information processing system according to claim 1 further comprising means for interrupting displaying in a course of the display of one page or one image of display data.

9. An information processing system according to claim 1 further comprising means for skipping pages other than a current page being displayed in a course of the display of one page or one image of displaying data.

10. An information processing system according to claim 1 further comprising print-out means having a print-out key, wherein when the print-out key is depressed in a course of the display of one page or one image of display data, the page being decoded is printed out.

* * * * *